Oct. 4, 1938.  J. J. HOPFIELD  2,131,875
NONREFLECTING WINDOW
Filed Dec. 31, 1935  4 Sheets-Sheet 1
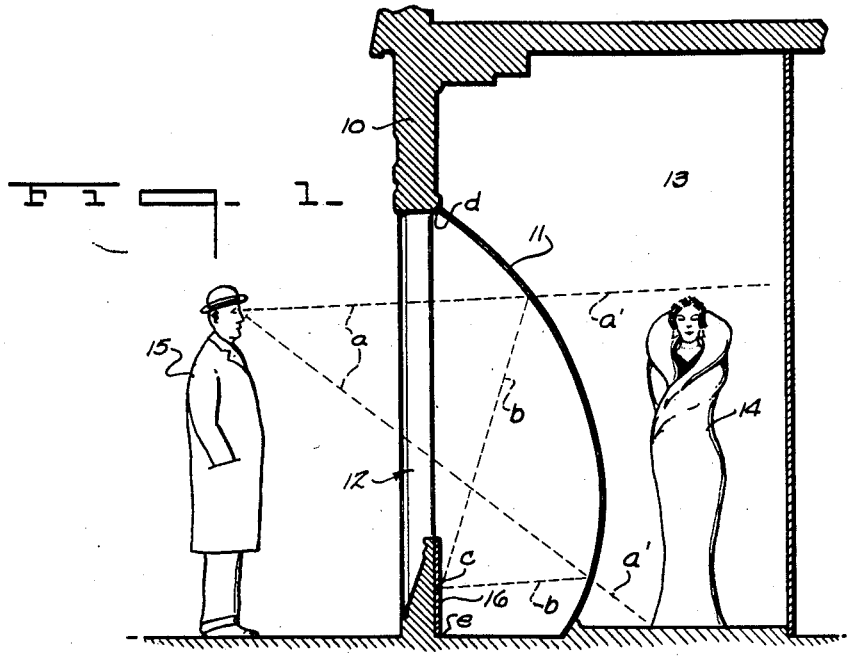
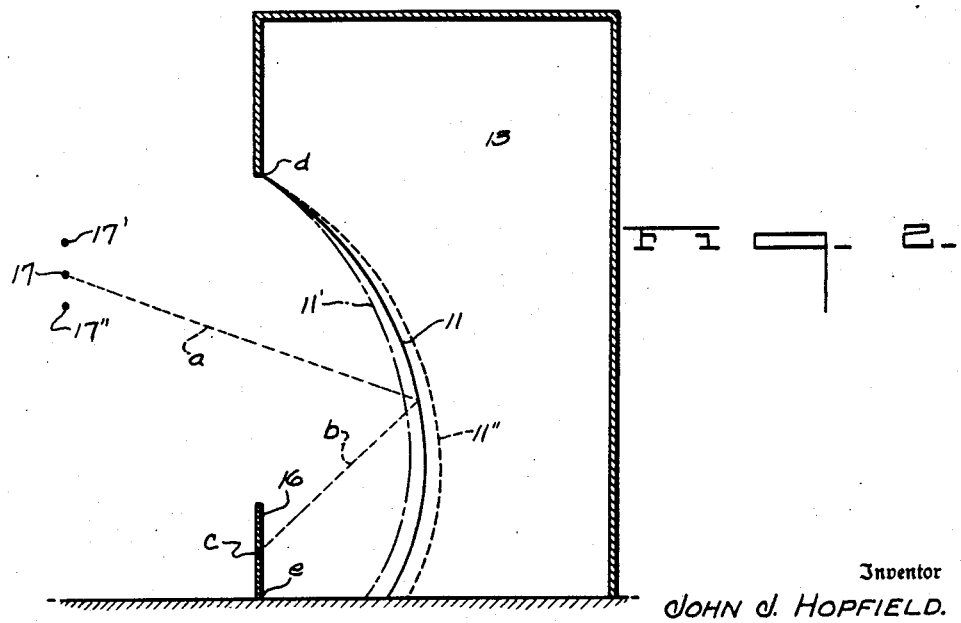
Inventor
JOHN J. HOPFIELD.
By Frank Frazier
Attorney Oct. 4, 1938.   J. J. HOPFIELD   2,131,875
NONREFLECTING WINDOW
Filed Dec. 31, 1935   4 Sheets-Sheet 2

Inventor
JOHN J. HOPFIELD.
By Frank Fraser
Attorney

Oct. 4, 1938.   J. J. HOPFIELD   2,131,875
NONREFLECTING WINDOW
Filed Dec. 31, 1935   4 Sheets-Sheet 3
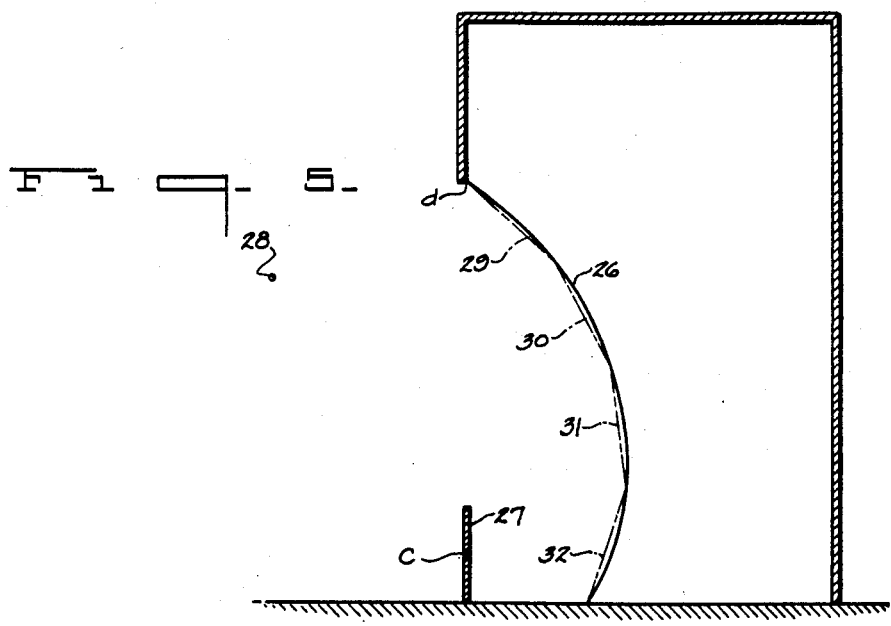
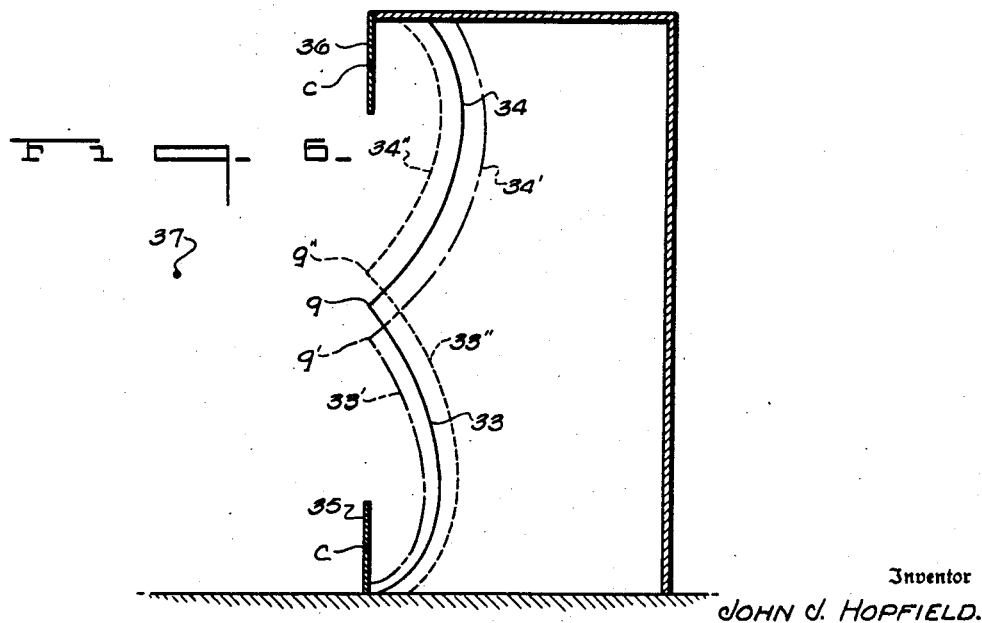
Inventor
JOHN J. HOPFIELD.
By Frank Fraser
Attorney

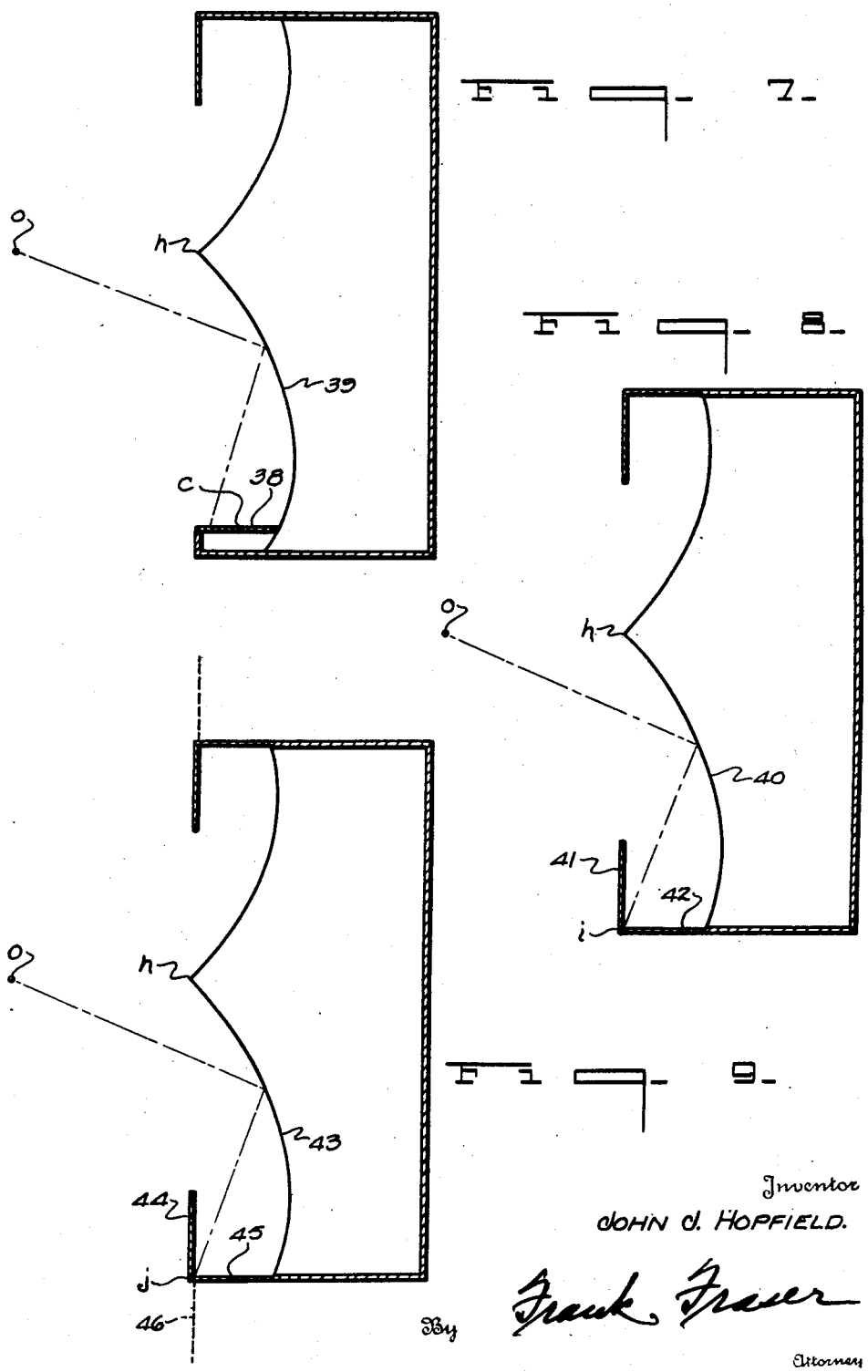

UNITED STATES PATENT OFFICE 2,131,875

NONREFLECTING WINDOW

John J. Hopfield, Toledo, Ohio, assignor to Libbey-Owens-Ford Glass Company, Toledo, Ohio, a corporation of Ohio Application December 31, 1935, Serial No. 56,992

2 Claims. (Cl. 88—1)

The present invention relates broadly to windows in general and more particularly to windows of the non-glare or non-reflecting type.

This form of window is of especial utility when used in stores and shops and behind which goods are to be displayed. The window is so constructed as to nullify or reduce external reflections so that an observer standing in front of the window may obtain a clear view of the articles on display without being distracted or annoyed by the reflection of objects in the street or of buildings upon the opposite side of the street.

Various designs of non-reflecting windows have been suggested and in practically all of these designs an absorbing screen is used which constitutes a dark background. This principle is illustrated in the patent to Gerald Brown 1,911,881, issued May 30, 1933, which discloses a window comprising two curved sheets of glass meeting as a cusp at about normal eye level, with the top and bottom of the window forming absorbing screens from which any light that would enter the observer's eye emanates.

The effectiveness of a window of this type in reducing or nullifying glare or reflections depends upon the curvature of the glass sheet and the positioning of the absorbing screen with respect thereto, so as to take the field of reflected view away from the ordinary outside objects. On the other hand, the curvature of the glass sheet depends upon several factors, including the size of the window opening, the position of the absorbing screen and the normal eye level of the average observer as well as his distance from the window when viewing the articles on display.

It is the aim of my invention to provide a simple reliable method for easily and quickly determining the ideal curvature of a glass sheet for any given size window opening.

I have discovered that there is a fundamental conic section that is applicable to all non-reflecting windows, namely, the conic section known as the ellipse. One of the properties of the ellipse that is applicable in this case is that any two radii meeting at a point on the arc make equal angles with the arc at that point. Another property of the ellipse which is also applicable is that the sum of the radii to any point on the arc is a constant. These properties of the ellipse are made use of in my invention and by the application of these properties to the problem at hand, the ideal curvature of a glass sheet for a given size window opening can be easily and quickly calculated.

Other objects and advantages of the invention will become more apparent when taken in connection with the accompanying drawings.

In the drawings wherein like numerals are employed to designate like parts throughout the same, Fig. 1 is a vertical sectional view through a non-reflecting window constructed in accordance with the present invention;

Fig. 2 is a diagrammatic view showing the relationship between the curved glass plate, absorbing screen and normal eye level of the average observer;

Fig. 5 is a diagrammatic view showing the use of a plurality of relatively small flat plates of glass;

Fig. 6 is a diagrammatic view of a window using two curved glass plates and two vertical absorbing screens;

Figs. 7, 8 and 9 are diagrammatic views of double window arrangements embodying different types of absorbing screens.

Figure 3:
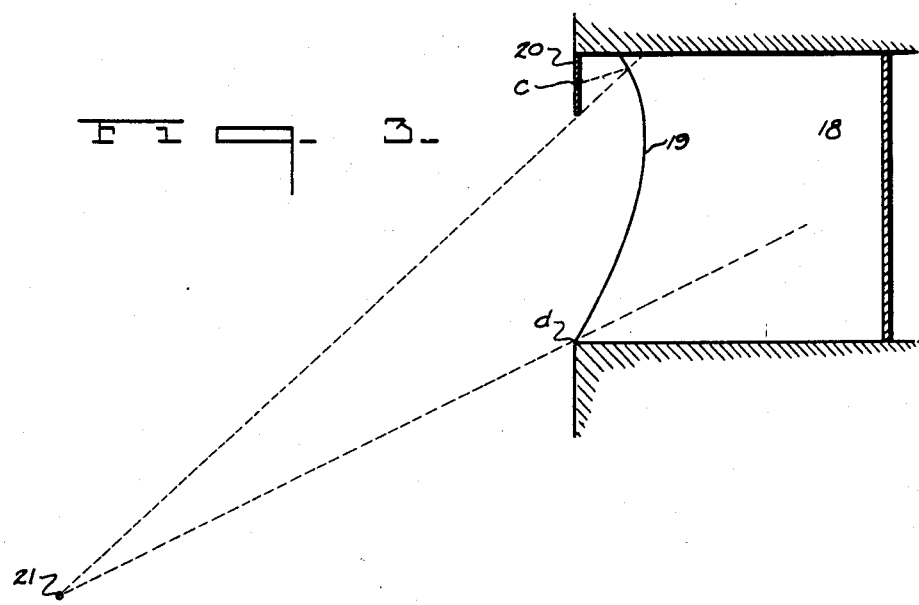
Fig. 3 is a diagrammatic view showing the application of the principle of the invention to a window located above the normal eye level.

Referring to the drawings and particularly to Fig. 1, 10 designates a store or shop window comprising a curved plate 11 formed of transparent material such as glass and fitted in the window opening 12. In back of the glass plate 11 is provided a chamber 13 in which the articles of merchandise, such as dress models 14 or the like, may be exhibited and which are viewed by the observer 15 located on the outside of the window. Positioned at the bottom of the window opening in front of the glass plate 11 and extending from the ground level is a vertical light absorbing screen 16 so disposed that the field of reflected view is directed from the glass plate onto the light absorbing screen. With this arrangement, the reflected field of view of the observer 15 is wholly at the light absorbing screen 16 so that no objectionable reflections can be seen. It is therefore possible with such a construction for the observer to look straight through the window and see any goods displayed behind it without any annoyance caused by reflection.

The lines $a$ indicate the lines of vision from the eye of the observer 15 to the glass plate 11, while the lines $b$ indicate the direction in which the rays of light would be reflected which passed along the lines $a$ and impinged against the glass plate 11, it being seen that said rays of light would be reflected against the absorbing screen 16 converging at the point $c$ and would not be returned by said screen to the eye of the observer to cause confusion and a reflection of objects outside the window. The lines $a$ would be continued, as indicated at $a'$, to the object displayed upon the opposite side of the glass plate from that upon which the observer is located.

The curvature of the glass plate 11 constitutes a portion of an ellipse and, as brought out above, the aim of the invention resides in the provision of a simple, reliable method for quickly and accurately determining the ideal curvature to be used. In determining this ideal curvature, the following factors must first be ascertained: (1) The height of the window opening 12 or, in other words, the vertical distance from point $d$ to point $e$; and (2) the normal position of the eyes of the average observer when viewing the display.

In the example shown in Fig. 2, the numeral 17 indicates the position of the eyes of an observer in front of the window 11, the height of his eyes being five feet from the ground, while the height of the window from points $d$ to $e$ is represented as being six and one-half feet. Also, in this figure and in all subsequent figures, the observer is represented as standing three feet from the front of the store; that is, from the plane of the absorbing screen. Further, the analysis is given in all cases for the observer looking in a direction normal to the store front. After determining the above factors, the ellipse is drawn with the eye 17 of the observer as one focus and the middle of the absorbing screen 16 as represented at $c$ as the second focus, with the radii being chosen so that the arc passes through the top point $d$ of the window. Since from the properties of the ellipse conjugate radii make equal angles at the surface at any point, all reflected light which enters the eye of the observer can come only from the middle of the absorbing screen. That is to say, if this screen is black, no reflected light enters the observer's eye no matter how sunny the store front may be. This enables the observer, therefore, to look through the window almost as though no glass were there. In fact, the glass is practically invisible and it is for this reason that this type of window is sometimes called an "invisible window". From the above, it will be seen that the invisibility of the glass is due to the particular curvature of the glass sheet forming the window and the position of the absorbing screen.

From an inspection of Fig. 2, it is also obvious that the screen 16 need be only an inch or less in width to be completely effective for this ideal position of the observer. However, if the screen is made of appreciable width, one and one-half feet for instance, serving in the nature of a base board for the window, when the observer need not be at exactly the point specified and will still be able to see perfectly through the glass. For instance, the ellipses 11' and 11" are drawn in the same manner as ellipse 11 except that the conjugate foci in the two cases are different. Thus, in the first case they are the eyes 17' of an observer, located five and one-half feet from the ground, and the point $c$ of the absorbing screen, while in the second case they are the eyes 17" of an observer four and one-half feet from the ground, and point $c$ of the absorbing screen.

It will be noted that the ideal curvature that best fits these two cases is slightly different from the one represented by 11. However, the width of the absorbing screen 16 is more than ample to give a perfect non-reflecting window even if window 11 is used in the three cases illustrated. The width of the screen likewise takes care of varying distances within limits, of the observer from the window.

Therefore, in determining the curvature of the window, it is necessary to decide first the height of the window and the place the absorbing screen will be, then the normal position of the eyes of the average observer when viewing the display both as to the height of the observer's eyes from the ground and the distance the observer will stand in front of the store. Then, by making the eyes of the observer, as represented at 17 in Fig. 2, and the central point $c$ of the absorbing screen 16 the foci of the ellipse, one draws the ellipse to pass through point $d$, the top of the window. The arc of this ellipse will be found to be the ideal shape or curvature for the non-reflecting window.

In Fig. 3 is represented a design for a window located above the eye level and illustrates the application of my method for determining the ideal curvature for such a window. In this figure, the chamber or compartment for receiving the goods to be displayed is designated 18, and in front thereof is a curved glass plate 19 which is a portion of an ellipse. The numeral 20 designates a vertical light absorbing screen depending from the top of the window and positioned in advance of the glass plate. In this case, the observer is situated eight feet from the store front, with his eyes at 21 located beneath the level of the window. The ideal window for non-reflection is an ellipse drawn with $c$, the middle of the absorbing screen 20, and 21 the eyes of the observer as foci and the arc passing through point $d$, as indicated. This gives a perfect non-reflecting window to the observer at or in the neighborhood of 21. Obviously, with this simple method of elliptical construction, it is possible to specify exactly the disposition of the absorbing screen and the shape and position of a window to meet any specified location.

Figure 4:
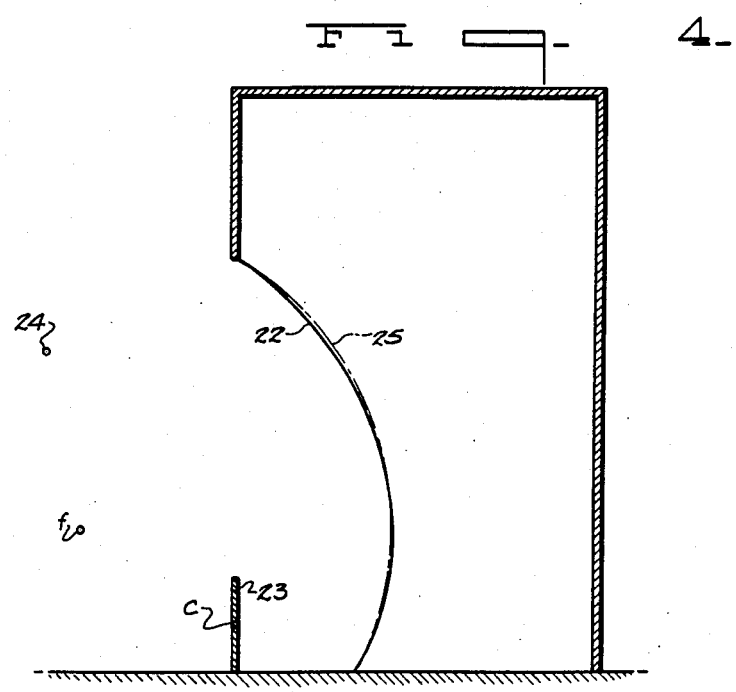
Fig. 4 is a diagrammatic view showing how a window formed as the arc of a circle may be fitted in place of the ellipse.

From the above, it becomes evident that every specific problem in non-reflecting windows would be best solved by a curved window designed especially for the case. Any great departure from the ideal case of course would show up as a fault in the window. This fault may not be great enough to merit fitting every specific case exactly. For instance, simplicity may require one to substitute a circle for an ellipse as the form of window. The ideal ellipse is again shown in Fig. 4 at 22, the absorbing screen at 23, and the normal eye level of the average observer at 24. A circle 25, drawn with $f$ as its center, is also shown, and it is seen that the circle and ellipse are practically coincident all the way. Therefore, a window of this curvature would answer the purpose very well. In making such an installation, it is first desirable always to plan the ideal elliptical fit and then put in the circle that most nearly coincides with the elliptical curve.

Another form of substitution for the elliptical window is shown in Fig. 5. The ellipse 26 is drawn as before with the center $c$ of the absorbing screen 27 and the eye 28 of the observer as foci, with the arc passing through the top of the window opening at $d$. It will be noted that an approximate fit of the ellipse may be made by using a plurality of relatively small flat plates of glass 29, 30, 31 and 32. Such an installation, combined with the absorbing screen 27 at the bottom, should also give fair service as a non-reflecting window. Again, the closeness of the fit of the flat plates or chords to the arc of the ellipse is an indication of how nearly the ideal such a window approaches.

In Fig. 6 is shown a window comprising the two transparent plates of glass 33 and 34 combined with the two vertical absorbing screens 35 and 36 positioned respectively beneath and above the window, the two glass plates meeting at a cusp at g. The eye of the observer is indicated at 37. The two glass plates 33 and 34 constitute intersecting ellipses, with the lower ellipse being drawn with the eye of the observer 37 and the center c of the lower absorbing screen 35 as foci, while the upper ellipse is drawn with the eye of the observer 37 and the center c of the upper screen 36 as foci. The arcs are made to intersect at the cusp g as indicated.

In order to give a different economy of show space in the upper and lower halves of the showcase, the pairs of ellipses 33'—34' and 33"—34" may be used. The foci of the ellipse 33 are common to the ellipses 33' and 33" while the foci for the upper ellipse 34 are common to the ellipses 34' and 34". The arcs of the pair of ellipses 33'—34' are made to intersect at the cusp g', while the arcs of the ellipses 33"—34" are made to intersect at the cusp g". The formation of this type of window, comprising two plates of glass and two absorbing screens, is really a compound of the problems illustrated in Figs. 2 and 3.

In the development of this invention, a study was made of the distribution of absorbing screens for greatest effectiveness (corrections) for the elliptical windows. For example, geometrical optics show that a vertical absorbing screen has the smallest angle of correction at the top of the window. That is, the observer's eyes must be situated within a certain narrow region for perfect vision. On the other hand, this same vertical screen corrects the middle and lower parts of the window through a much greater range of positions of the observer. These corrections also show that a horizontally disposed absorbing screen will make ample correction for the top of the window and less for the lower part. Therefore, cases may arise where the use of a horizontal screen might be preferred to a vertical screen, and in planning such a window one focus of the ellipse should be transferred to the middle of the absorbing screen. For example, in Fig. 7 is shown a type of window similar to that in Fig. 6 but including a horizontal absorbing screen 38. The foci of the lower glass plate 39 are the eyes of the observer o and the center c of the absorbing screen 38, with the arc of the ellipse being drawn to pass through the cusp h.

Cases may also arise where a combination of vertical and horizontal absorbing screens are desirable as shown in Fig. 8. Arranged at the bottom of the elliptical window 40 are the vertical and horizontal absorbing screens 41 and 42 respectively, and in such case the one focus of the ellipse should be transferred to approximately the line of intersection of the two screens as indicated at i.

It is also possible to effectively lengthen an absorbing screen by use of a properly placed mirror as shown in Fig. 9, wherein is provided at the bottom of elliptical window 43 a vertical absorbing screen 44 in combination with a horizontal mirror 45. The reflection of the absorbing screen 44 in the mirror 45 will, for all practical purposes, double the length of the absorbing screen as indicated at 46, and the one focus of the ellipse should be transferred to the bottom of the absorbing screen as indicated at j.

The above discussion of Figs. 7, 8 and 9 also holds for the upper portion of the double window except that the arrangement of absorbing screens and windows is of course inverted.

I claim:

1. A non-reflecting display window for a given size window opening including a curved transparent glass plate constituting a portion of an ellipse, and a light absorbing screen associated therewith, the elliptical curvature of the glass plate being such that when the plate is mounted in the window opening the foci of the ellipse will be represented by a point on the light absorbing screen and a point located at the normal position of the eyes of the average observer viewing the display while the ellipse will pass through or near the top of the window opening whereby the reflected field of view of the observer is wholly at the light absorbing screen.

2. A non-reflecting display window for a given size window opening comprising two curved transparent glass plates in combination with two light absorbing screens positioned in front of the window at the top and bottom thereof, said glass plates being formed in a double elliptical curve and converging together in the form of a cusp at approximately normal eye level, the elliptical curvature of the upper plate being such that the foci of the ellipse are represented by a point on the upper light absorbing screen and a point located at the normal position of the eyes of the average observer viewing the display, while the elliptical curvature of the lower plate has as its foci a point on the lower absorbing screen and a point located at the normal position of the eyes of the average observer, the ellipses intersecting at the cusp whereby the reflected field of view of the observer is wholly at the light absorbing screens.

JOHN J. HOPFIELD.